(12) United States Patent
Cahill

(10) Patent No.: US 8,565,939 B2
(45) Date of Patent: Oct. 22, 2013

(54) DISTRIBUTED PEDAL SYSTEM FOR AIRCRAFT

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 1009 days.

(21) Appl. No.: 12/432,918

(22) Filed: Apr. 30, 2009

(65) Prior Publication Data

US 2010/0280725 A1    Nov. 4, 2010

(51) Int. Cl.
*B64C 19/02* (2006.01)
*G06F 17/00* (2006.01)
*G05D 1/00* (2006.01)
*B60T 7/02* (2006.01)

(52) U.S. Cl.
USPC ................................ 701/3; 701/70; 244/75.1

(58) Field of Classification Search
USPC .......... 244/75.1, 76, 194, 195, 196, 220, 221,
244/76 R, 228; 701/1, 3, 29, 31, 33, 34, 35,
701/36, 70, 76, 78, 29.1, 32.7, 71, 72;
340/945
See application file for complete search history.

(56) References Cited

U.S. PATENT DOCUMENTS 6,513,885 B1 * 2/2003 Salamat et al. .......... 303/122.09
2005/0251306 A1   11/2005 Gowan et al.

FOREIGN PATENT DOCUMENTS

GB    2460323    12/2009
WO    2008/097260    8/2008

OTHER PUBLICATIONS

Patents Act 1977: Search Report under Section 17 dated Apr. 16, 2010.

* cited by examiner

*Primary Examiner* — Thomas Tarcza
*Assistant Examiner* — Edward Pipala
(74) *Attorney, Agent, or Firm* — Snell & Wilmer L.L.P.

(57) ABSTRACT

A braking system that can reduce wiring without sacrificing performance. The system includes a data concentrator in the form of a distributed sensor processor unit for receiving braking command signals from a plurality of sensors and, based on the command signals, generating a brake control signal to be sent to a brake system control unit via a serial connection or the like.

12 Claims, 3 Drawing Sheets

DISTRIBUTED PEDAL SYSTEM FOR AIRCRAFT

FIELD OF THE INVENTION

The present invention relates generally to braking systems and, more particularly, to a braking system for an aircraft.

BACKGROUND OF THE INVENTION

Typical aircraft today rely on a large amount of onboard electronic and computer equipment for operation of critical systems, safety, navigation, etc. For most aircraft, the space required for electronic and computer equipment tends to be substantial, and the total volume required is roughly the same regardless of aircraft size. Accordingly, onboard space is at a premium, particularly in smaller aircraft. Space in and around the cockpit of an aircraft is particularly valuable.

Moreover, today's aircraft can have literally miles of wiring for electrical systems and controls. The massive amount of wiring not only requires significant time to install in the aircraft but also contributes to the overall weight of the aircraft.

SUMMARY OF THE INVENTION

The present invention provides a braking system that reduces wiring and without sacrificing functionality. The system includes a data concentrator in the form of a distributed sensor processor unit for receiving braking command signals from a plurality of sensors and, based on the command signals, generating a brake control signal to be sent to a brake system control unit via a serial connection or the like. The data concentrator can be located remotely from the control unit such as in the cockpit, for example.

Accordingly, an aircraft braking system includes a brake assembly operative to brake at least one wheel of an aircraft, a plurality of sensors associated with one or more respective user interface devices, such as pedals, for sensing activation of the device and generating a signal in response thereto, a distributed sensor processor unit for receiving the signals from the plurality of sensors and generating a brake control signal, and a brake system control unit for receiving the brake control signal from the distributed sensor processor unit and controlling the brake assembly in response thereto to effect braking of the at least one wheel.

The brake system control unit and the distributed sensor processor unit can be connected via a serial link, and the brake assembly can be an electromechanical brake assembly. The brake system control unit can be located remotely from the distributed sensor processor unit, and the system can further comprise a redundant second brake system control unit for receiving the brake control signal from the distributed sensor processor unit and controlling the brake assembly in response thereto to effect braking of the at least one wheel. The distributed sensor processor unit can be configured to verify the health of each sensor connected thereto. The braking system can have left and right braking assemblies, wherein the distributed sensor processor unit can be configured to resolve the amount of braking on the respective left and right hand brake assemblies.

An aircraft including the aircraft braking system can have the brake system control unit located remotely from a cockpit of the aircraft with the distributed sensor processor unit located within the cockpit.

DETAILED DESCRIPTION

Figure 1:
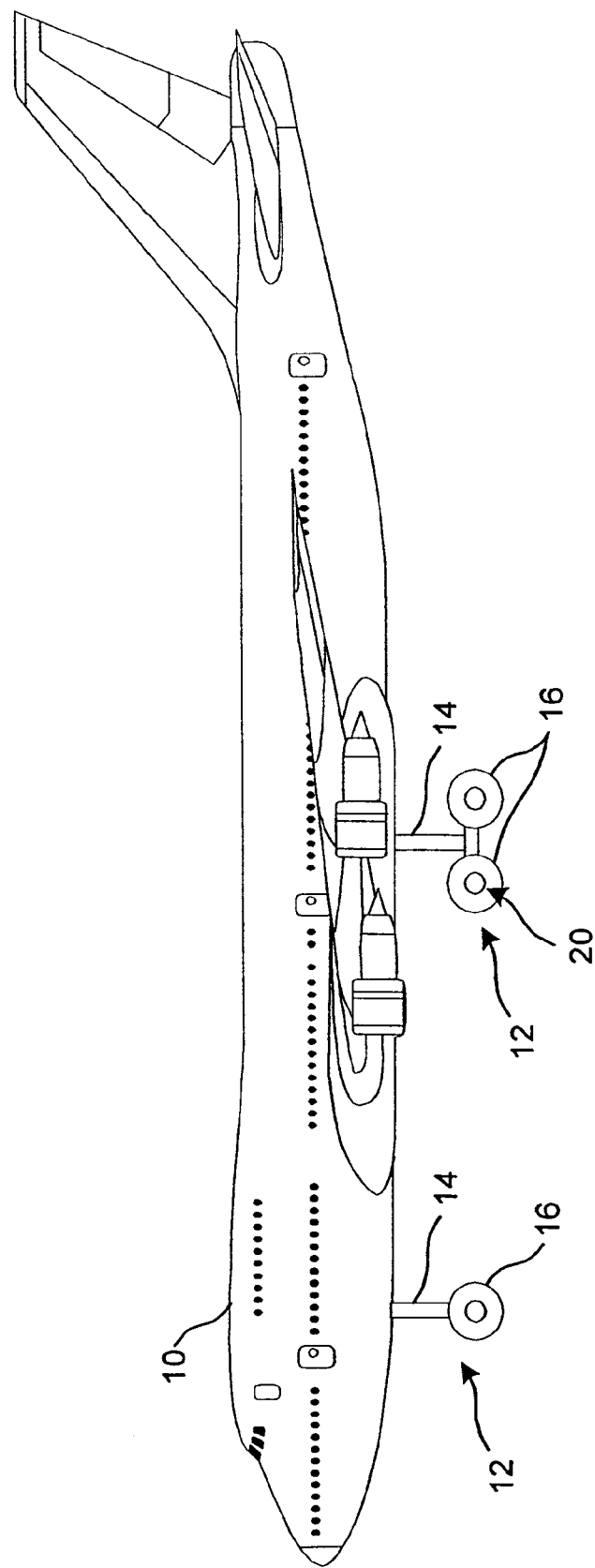
FIG. 1 is a schematic illustration of an exemplary aircraft having at least one electromechanical braking system in accordance with the present invention.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form.

The principles of the invention will now be described with reference to the drawings. Because the invention was conceived and developed for use in an aircraft braking system, it will be herein described chiefly in this context. However, the principles of the invention in their broader aspects can be adapted to other types of braking systems.

Referring initially to FIG. 1, an aircraft 10 has at least one electromechanical braking system associated with a wheel of the aircraft. An exemplary electromechanical braking system in accordance with the present invention is described below. The illustrated aircraft 10 is intended to depict a generic aircraft and not any particular make or model of aircraft. The aircraft 10 includes landing gear 12. The landing gear 12 may include a moveable strut 14 and wheels 16.

One or more of the wheels 16 can have a braking system 20 for braking the wheel 16. A typically braking system employs four pedals for actuation: the left and right pilot's brake pedals, and the left and right copilot's brake pedals. Each pedal may have two sensors, such as linear variable displacement transducers (LVDTs), and each sensor typically may have five wires associated with it.

Such systems usually have two brake control channels. Some are a primary/alternate and others are InBoard (IB) and OutBoard (OB) (IB/OB) systems. As will be described, a Brake System Control Unit (BSCU) connected to the pedals has hardware and software to support the brake pedals. Usually such braking systems are redundant by IB(channel 1)/OB (channel 2) or Primary (channel 1)/Alternate (channel 2). Generally, the redundancy is made throughout the systems so that the loss of a brake actuator doesn't cause all braking to be lost. In particular, the aircraft, even if it is a primary/alternate architecture, has elements of an IB/OB system since balanced left-hand and right-hand braking is important. If the aircraft were to end up without brakes on one landing gear, the application of the remaining brakes could be troublesome since, if applied, the aircraft would steer hard in the direction of the landing gear having brakes.

Figure 2:
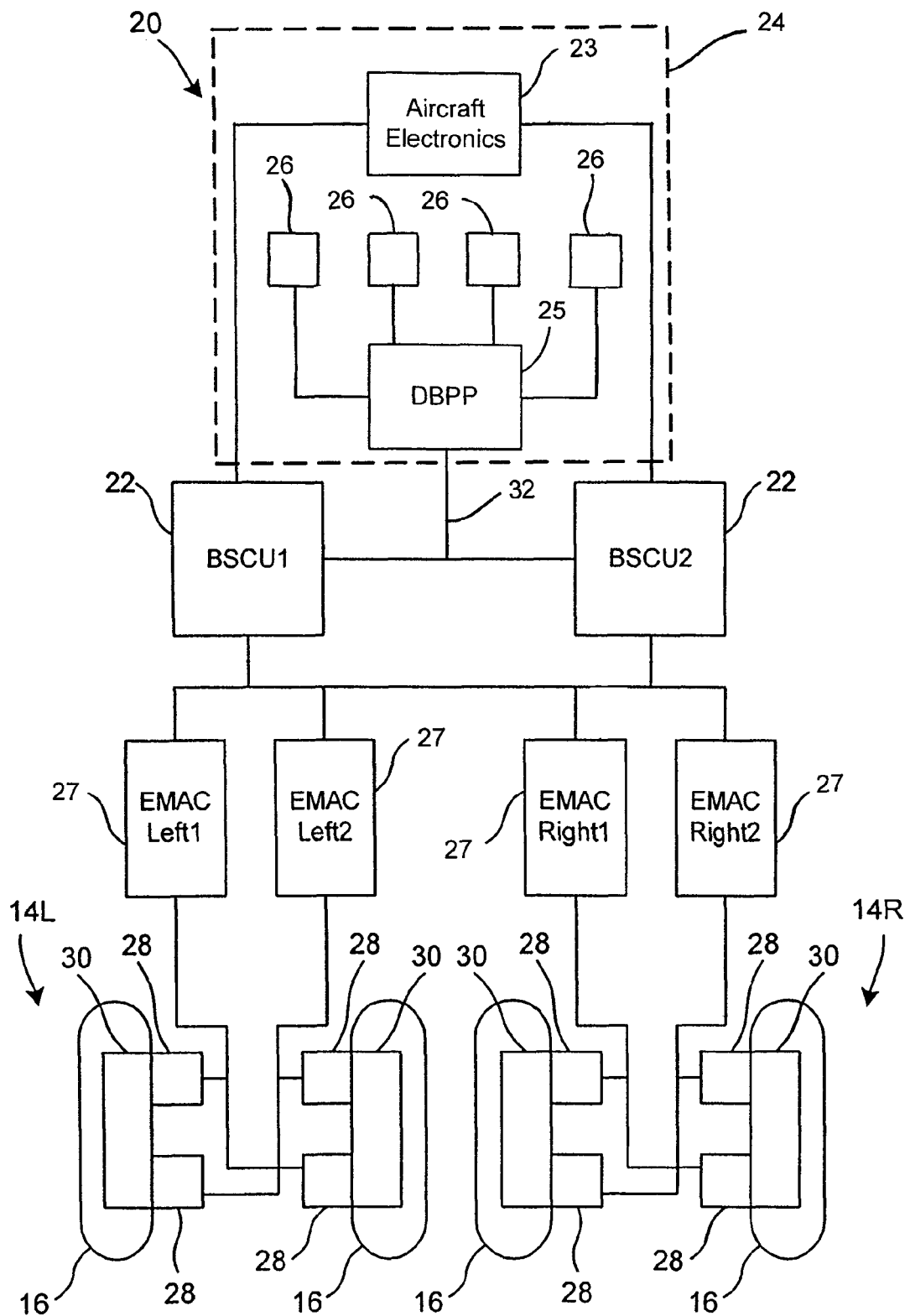
FIG. 2 is a block diagram of an exemplary braking system for the aircraft in accordance with the present invention.

With reference to FIG. 2, a block diagram illustrates an exemplary braking system 20 in accordance with the invention for the aircraft 10. The braking system 20 represents an exemplary architecture for satisfying typical redundancy and performance specifications of an aircraft. Such architecture is presented by way of example to illustrate the context in which the principles of the present invention may be employed. It will be appreciated, however, that the present invention has utility with other braking systems and systems other than braking systems. Therefore, the present invention is not limited to the particular architecture shown.

The system 20 includes two brake system control units (BSCU) 22 designated BSCU1 and BSCU2, respectively. BSCU1 and BSCU2 are redundant and are both configured to provide an input/output interface to aircraft electronics 23 within a cockpit 24 of the aircraft 10, for example, via a bus or network. In addition, BSCU1 and BSCU2 each contain circuitry (e.g., a processor for executing logic embodied as executable code) for performing top level brake control and antiskid algorithm processing functions. In accordance with the invention, a distributed brake pedal processor unit (DBPP) 25 receives proportional brake command signals from multiple transducers 26 associated with user interface devices, such as brake pedals or a parking/emergency brake switch or lever, etc. For example, each respective left and right brake pedal for a pilot and copilot may have associated therewith two transducers 26 (e.g., a total of eight transducers). BSCU1 and BSCU2 each receive braking command signals from the DBPP 25 via a serial link 32.

BSCU1 and BSCU2 process the signals from the DBPP 25 based on the aforementioned brake control and antiskid algorithms to produce a brake command signal, or set of signals. The brake command signal(s) are provided to electromechanical actuator controllers (EMACs) 27. The particular brake control and antiskid algorithms employed by the BSCUs 22 can be conventional. As such, further detail based thereon is largely omitted in the present description for sake of brevity.

BSCU1 and BSCU2 each provide brake commands and otherwise communicate with the EMACs 27 via a suitable infrastructure, such as a bus or network. In the illustrated system 20, there are four redundant EMACs 27 respectively labeled EMAC Left1, EMAC Left2, EMAC Right1 and EMAC Right2. As shown in FIG. 2, each EMAC 27 is coupled to the BSCUs 22 to receive brake commands (also referred to as input commands or input braking commands) from each of the BSCUs 22. Each EMAC 27 contains circuitry (e.g., a processor for executing logic embodied as executable code) for converting the brake commands into a motor current command. Each EMAC 27 further contains a current driver for generating a motor drive signal based on the motor current command.

The EMACs 27 may also be referred to simply as controllers 27. The controllers 27 receive left and right brake commands from the BSCUs 22 and provide the motor drive signal to brake actuator modules, also referred to as electromechanical actuators 28 or simply as actuators 28, to drive an actuator component to a commanded position. In this manner, controlled braking may be accomplished.

For each wheel 16, there may be multiple actuators 28 to apply braking force to a brake stack 30 in response to electrical control signals, or motor drive signal, provided by a respective controller 27. For example, the controllers 27 may be paired such that one of the controllers 27 of a pair controls half of the actuators 28 for an associated one of a left wing landing gear 14L or a right wing landing gear 14R. The controlled actuators 28 for any one controller 27 can be on different wheels 16 as shown or on the same wheel 16, in which case a single controller 27 may control all actuators 28 associated with one of the wheels 16.

As will be appreciated, the DBPP 25 can be mounted within the cockpit 24 along with the transducers 26. Thus, unlike prior systems wherein each transducer 26 was connected individually to each of BSCU1 and BSCU2, the present invention enables a single connection via serial link 32. Accordingly, redundancy can be achieved with less wiring during installation, and/or the BSCU's can be located remote from the cockpit 24 without necessitating long runs of cable from each transducer 26. This can result in a weight reduction of the aircraft as compared to an aircraft having a conventional brake system.

The DBPP 25 can be configured to perform various operations in addition to receiving the pedal sensor signals such as verifying the health of each transponder and resolving the amount of braking on respective left and right brakes (including arbitration between pilot and copilot). This may include determining the correct command based upon various sensor curves, for example. The DBPP 25 then transmits the brake command signal via high-speed serial connection 32 to BSCU1 and BSCU2.

Figure 3:
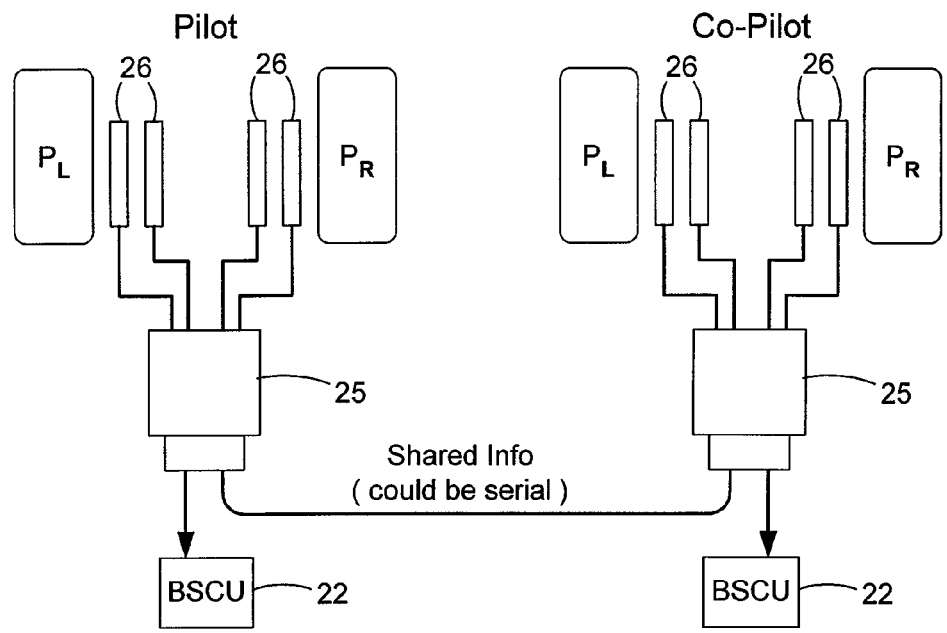
FIG. 3 is a schematic illustration of an exemplary brake input sensor and distributed brake pedal processor arrangement in accordance with the present invention.
Figure 4:
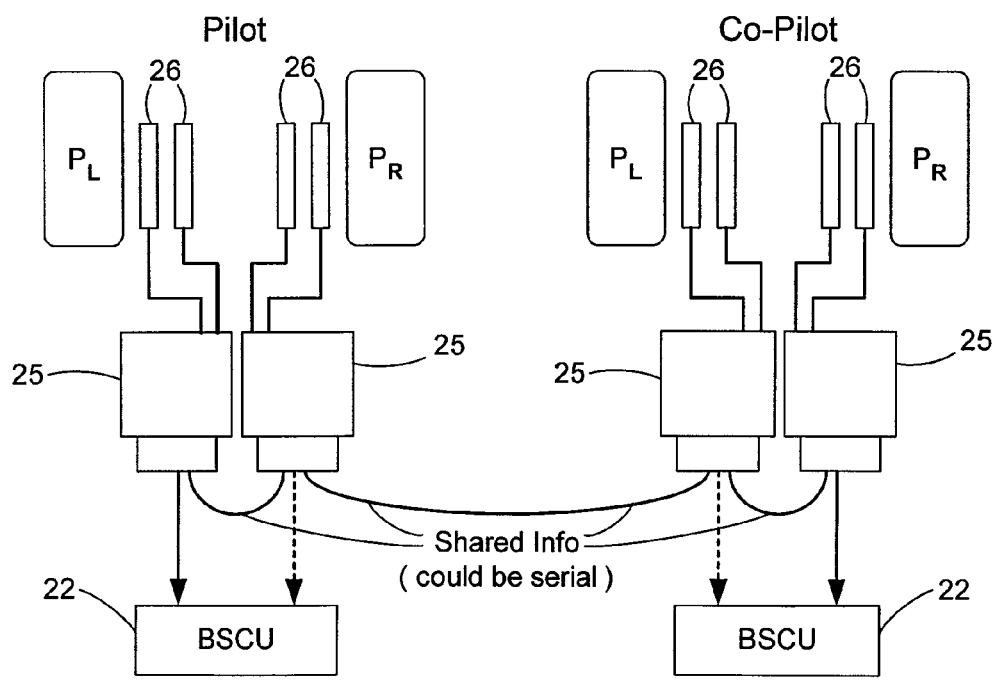
FIG. 4 is a schematic illustration of another exemplary brake input sensor and distributed brake pedal processor arrangement in accordance with the present invention.

Turning now to FIGS. 3 and 4, two other exemplary embodiments of the invention are schematically illustrated. In FIG. 3, respective right and left pedals $P_L$ and $P_R$ for both a pilot and a copilot are each associated with a redundant pair of transducers 26 for generating a signal in response to movement of a pedal. Respective transducers 26 for the pilot and copilot are linked to respective DBPP units 25. Each DBPP 25 is configured to resolve a left hand braking command and a right hand braking command based on movement of the respective left and right pedals PL and PR. In this embodiment, each DBPP unit 25 shares its left and right hand braking signal, and other information (e.g., sensor health etc.), with the other DBPP unit 25 via a serial link or the like so as to provide redundancy and/or to derive a single LH/RH braking level. Each DBPP unit 25 further communicates with a respective BSCU (22) thereby providing braking signals for all four pedals. Each BSCU 22 can be connected to various EMACs and operates to control the brakes in a manner previously described, for example, including arbitration between pilot and copilot brake signals.

Turning to FIG. 4, another pedal sensor and DBPP unit arrangement is illustrated. In this embodiment, a separate DBPP unit 25 is provided for each pair of transducers 26 associated with respective left and right pedals for both a pilot and a copilot. Each DBPP 25 resolves a braking signal based on movement of its respective pedal, and shares that braking signal with the other DBPP units 25. Each DBPP unit 25 then communicates all four brake pedal signals to the BSCUs 22. Alternatively, only one of the DBPP units 25 of the associated with the pilot and copilot may communicate all four braking signals to the BSCU 22. As will be appreciated, each DBPP 25 can also verify the health of the sensors, etc., while the BSCUs 22 can perform arbitration between pilot and copilot brake signals, for example. Alternatively, arbitration between pilot and copilot signals could be performed by one or more of the DBPP units 25.

Aspects of the invention may also be useful during installation by providing an installer with necessary feedback. Distributing the pedal logic to the cockpit via DBPPs 25 can simplify manufacturing and assembly of the brake system. For example, the wiring of the brake system between the cockpit and the BSCUs 22, although still required, can be reduced from eight shielded five-conductor cables (e.g., one cable per transducer) to a pair of two-conductor shielded wires (redundant serial lines) or a pair of three-conductor shielded cables (for analog signals (LH+, RH+, GND). Since the cable runs to the BSCUs can be quite long in some installations, this can result in substantial weight reduction and can simplify cable management. Moreover, the BSCUs 22 themselves can be less complex, smaller and lighter.

As will be appreciated, the DBPP units 25 in accordance with the invention can perform many tasks ordinarily performed by the a BSCU. For example, a DBPP could perform any or all of the following functions:

1) Determine if the brake pedals are functioning correctly
2) Derive the value (percent application) of braking being commanded
3) Resolve the action to be taken if a single or multiple sensors fail
4) Compute which of the left pedals (pilot's or copilot's) is to be used for the left gear's brakes
5) Compute which of the right pedals (pilot's or copilot's) is to be used for the right gear's brakes
6) Convert the LH and RH braking percent to commanded braking levels
7) Resolve sensor problems locally (e.g., sensor health issues)

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft braking system comprising
   a brake assembly operative to brake at least one wheel of an aircraft,
   a plurality of sensors associated with a respective user interface device for sensing activation of the user interface device and generating a signal in response thereto,
   a distributed sensor processor unit for receiving the signals from the plurality of sensors and generating a brake control signal, and
   a brake system control unit for receiving the brake control signal from the distributed sensor processor unit and controlling the brake assembly in response thereto to effect braking of the at least one wheel.

2. An aircraft braking system as set forth in claim 1, wherein the brake system control unit and the distributed sensor processor unit are connected via a serial link.

3. An aircraft braking system as set forth in claim 1, wherein the brake assembly is an electromechanical brake assembly.

4. An aircraft braking system as set forth in claim 1, wherein the user interface device is a brake pedal.

5. An aircraft braking system as set forth in claim 1, wherein the brake system control unit is located remotely from the distributed sensor processor unit.

6. An aircraft braking system as set forth in claim 1, further comprising a redundant second brake system control unit for receiving the brake control signal from the distributed sensor processor unit and controlling the brake assembly in response thereby effect braking of the at least one wheel.

7. An aircraft braking system as set forth in claim 1, wherein the distributed sensor processor unit is configured to verify the health of each sensor attached thereto.

8. An aircraft braking system as set forth in claim 1, wherein the brake assembly is a hydraulic brake assembly.

9. An aircraft braking system as set forth in claim 1 having left and right braking assemblies for braking respective left and right wheels of an aircraft, wherein the distributed sensor processor unit is configured to resolve the amount of braking on the respective left and right hand brake assemblies.

10. An aircraft having a plurality of wheels and including the aircraft braking system as set forth in claim 1 for braking at least one of the wheels.

11. An aircraft as set forth in claim 10, wherein the brake system control unit is located remotely from a cockpit of the aircraft.

12. An aircraft as set forth in claim 10, wherein the distributed sensor processor unit is located within a cockpit of the aircraft.

* * * * *